(12) United States Patent
Stephan et al.

(10) Patent No.: US 8,826,296 B2
(45) Date of Patent: Sep. 2, 2014

(54) METHOD OF SUPERVISING A PLURALITY OF UNITS IN A COMMUNICATIONS NETWORK

(75) Inventors: Emile Stephan, Pleumeur Bodou (FR); Yves Cognet, Paris (FR)

(73) Assignee: France Telecom, Paris (FR)

( * ) Notice: Subject to any disclaimer, the term of this patent is extended or adjusted under 35 U.S.C. 154(b) by 1164 days.

(21) Appl. No.: 12/447,142

(22) PCT Filed: Oct. 23, 2007

(86) PCT No.: PCT/FR2007/052231
§ 371 (c)(1),
(2), (4) Date: Jun. 29, 2009

(87) PCT Pub. No.: WO2008/050059
PCT Pub. Date: May 2, 2008

(65) Prior Publication Data
US 2010/0031273 A1 Feb. 4, 2010

(30) Foreign Application Priority Data
Oct. 26, 2006 (FR) ..................... 06 54564

(51) Int. Cl.
*G06F 3/00* (2006.01)
*G06F 9/44* (2006.01)

(52) U.S. Cl.
USPC .......................... 719/310; 717/100

(58) Field of Classification Search
USPC .......................... 719/310; 717/100
See application file for complete search history.

(56) References Cited

U.S. PATENT DOCUMENTS

| 6,359,895 B1 | 3/2002 | Yamanaka |
| 2003/0097461 A1* | 5/2003 | Barham et al. ................ 709/235 |
| 2004/0122942 A1* | 6/2004 | Green et al. .................. 709/224 |
| 2008/0192632 A1* | 8/2008 | Bader ........................ 370/230.1 |

FOREIGN PATENT DOCUMENTS

WO WO 01/55862 A 8/2001

OTHER PUBLICATIONS

Ayman Kayssi, FPGA-Based Internet Protocal Firewall Chip, 2000.*
International Search Report from counterpart foreign Application No. PCT/FR2007/052231 filed on Oct. 23, 2007.
English translation of the International Preliminary Report on Patentability and Written Opinion dated May 5, 2009 for corresponding International Application No. PCT/FR2007/052231, filed Oct. 23, 2007.

* cited by examiner

*Primary Examiner* — Lechi Truong
(74) *Attorney, Agent, or Firm* — David D. Brush; Westman, Champlin & Koehler, P.A.

(57) ABSTRACT

A method is provided for supervising a plurality of units in a communications network. The method includes a step of a first supervisor device receiving from a plurality of units information notifications having a plurality of information fields. For each information notification received, at least one imprint is generated, which includes codes extracted from predetermined fields of the notification. The method further includes counting the number of occurrences of at least one imprint, and notifying at least one master supervisor device of at least one imprint and the number of occurrences counted for that imprint.

19 Claims, 2 Drawing Sheets

METHOD OF SUPERVISING A PLURALITY OF UNITS IN A COMMUNICATIONS NETWORK

CROSS-REFERENCE TO RELATED APPLICATIONS

This application is a Section 371 National Stage Application of International Application No. PCT/FR2007/052231, filed Oct. 23, 2007 and published as WO 2008/050059 on May 2, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique for supervising a plurality of units in a communications network.

BACKGROUND OF THE DISCLOSURE

Various techniques for supervising units in a communications network are known to the person skilled in the art. A supervisor unit is generally responsible for supervising a limited number of units. For a communications network operator, setting up supervision of a large number of (approximately one million) terminal units disposed on user premises causes a problem with scaling up, especially for the management of alarms sent back from the terminal units to the supervisor unit. While operating, these terminal units can send unsolicited alarms. By way of illustrative example, the document RFC 3164 defines a Syslog alarm that notifies a supervisor unit of an event such as the occurrence of an anomaly. The alarm described in the document RFC 3164 contains dedicated severity and facility fields from which a priority level of the alarm can be deduced. On reception of a priority alarm, the supervisor unit can analyze it and act accordingly. However, this management method is not well suited to a vast installed base of terminal units. In the event of a general anomaly affecting all or at least a major portion of the units of the installed base, there can be an avalanche of alarms that are difficult to manage in real time for the supervisor unit and a higher priority alarm can be buried in an avalanche of lower priority alarms. Moreover, the occurrence of an avalanche of lower priority alarms can also require fast analysis by the operator.

SUMMARY

There is therefore a need for a technique enabling a supervisor unit to identify in a stream of alarms an alarm reporting a problem encountered by a terminal unit, or even a number of terminal units.

An aspect of the present disclosure therefore relates to a method of supervising a plurality of units in a communications network. The method comprises:

a step of a first supervisor device receiving from a plurality of units information notifications comprising a plurality of information fields;

a step of generating for each information notification received at least one imprint consisting of codes extracted from predetermined fields of said notification;

a step of counting the number of occurrences of at least one imprint;

a step of notifying at least one master supervisor device of at least one imprint and the number of occurrences counted for that imprint.

A first supervisor device receives from a plurality of units information notifications comprising a plurality of information fields. These units can be user gateways, which themselves manage other units, terminal units, and robots adapted to carry out measurements at the request of a user or another unit. From these notifications, the method produces on the fly, i.e. in real time, an imprint of the notifications received and counts the number of occurrences of the imprint. The master supervisor device therefore receives from a first supervisor device a summary based on the imprints generated and the number of occurrences counted, providing an overview, for example of a geographical area or of a set of units with the same IP address prefix or for a given service or for the same type of anomaly, whilst retaining a view of high-priority information linked to one or more terminal units.

It should be noted that an embodiment of the invention stems from a problem of identifying within a stream of alarms an alarm reporting an anomaly encountered by a terminal unit in a communications network. However, one or more embodiments of the invention applies equally to other types of supervisory notification such as configuration information, identification information, billing information, location information, statistics, measurements, and counts, and provides the master supervisor device with summaries of these notifications.

The method advantageously further comprises a step of determining the fields of the notification from which an imprint is to be generated as a function of a rate of arrival of the notifications at the first supervisor device.

As a function of the rate at which notifications arrive from the units, the first supervisor device adapts the depth of the imprint and therefore of the summary that it produces in order to avoid overloading the master supervisor device. This also saves processor time in the first supervisor device, which generates an imprint from a smaller number of fields of the notifications.

Moreover, if a notification consisting of chained information tickets is received at least from a unit an imprint is generated from fields of all said tickets.

The notifications can take the form of a string of tickets containing increasingly detailed information. They then consist of a master ticket to which a secondary ticket is chained. The secondary ticket can also point to another ticket. The imprint is then generated from predetermined fields of all of this string of tickets.

The method comprises, before executing the imprint generation step, a step of regulating the notifications by eliminating tickets from the chain as a function of the load on the first supervisor device.

Thus in the event of an overload, regulation is effected, by eliminating detailed tickets, as soon as the notification is received and before the generation of an imprint.

The method advantageously comprises a step of the first supervisor storing received information notifications and a step of sending stored information following a request from the master supervisor device, said request being effected after a notification.

Following reception of a notification of an imprint and the number of occurrences counted for that imprint, or for a reason specific to the operation of the network, the master supervisor device can request detailed information from the first supervisor device. Thus it decides what detailed information it wishes to receive.

Moreover, the method then comprises, during the received notification storage step, aggregation of those notifications by the first supervisor device in accordance with a rate of aggregation that also depends on the rate of arrival of notifications at the first supervisor device.

The first supervisor device stores the notifications received and can aggregate them as a function of an aggregation rate that also depends on the rate at which information arrives. Accordingly, in a period of overload, the memory capacity and the processor time of the first master device are preserved.

Furthermore, the method further comprises, after the notification reception step, a step of sorting the notifications as a function of a type contained in a field and wherein the step of counting at least one imprint is effected on the imprints generated from notifications sorted by type in order to generate a view for each type.

Carried out before the step of generating an imprint, the step of sorting information notifications by type simplifies the step of counting the occurrences of an imprint, this step being effected on "dedicated" imprints, and produces a summary for each type.

An embodiment of the invention also relates to a supervisor device adapted to supervise a plurality of units in a communications network. The device comprises:
    means for receiving from a plurality of units information notifications comprising a plurality of information fields;
    means for generating for each information notification received at least one imprint consisting of codes extracted from predetermined fields of said notification;
    means for counting the number of occurrences of at least one imprint;
    means for notifying at least one master supervisor device of at least one imprint and the number of occurrences counted for that imprint.

An embodiment of the invention further relates to a supervision system adapted to supervise a plurality of units in a communications network.

The system comprises:
    at least one supervisor device as described above;
    at least one master supervisor device comprising means for receiving a notification comprising at least one imprint and a number of occurrences counted for that imprint.

BRIEF DESCRIPTION OF THE DRAWINGS

The invention can be better understood in the light of the following description of one particular embodiment of the invention with reference to the appended drawings, in which.

DETAILED DESCRIPTION OF ILLUSTRATIVE EMBODIMENTS

Figure 1:
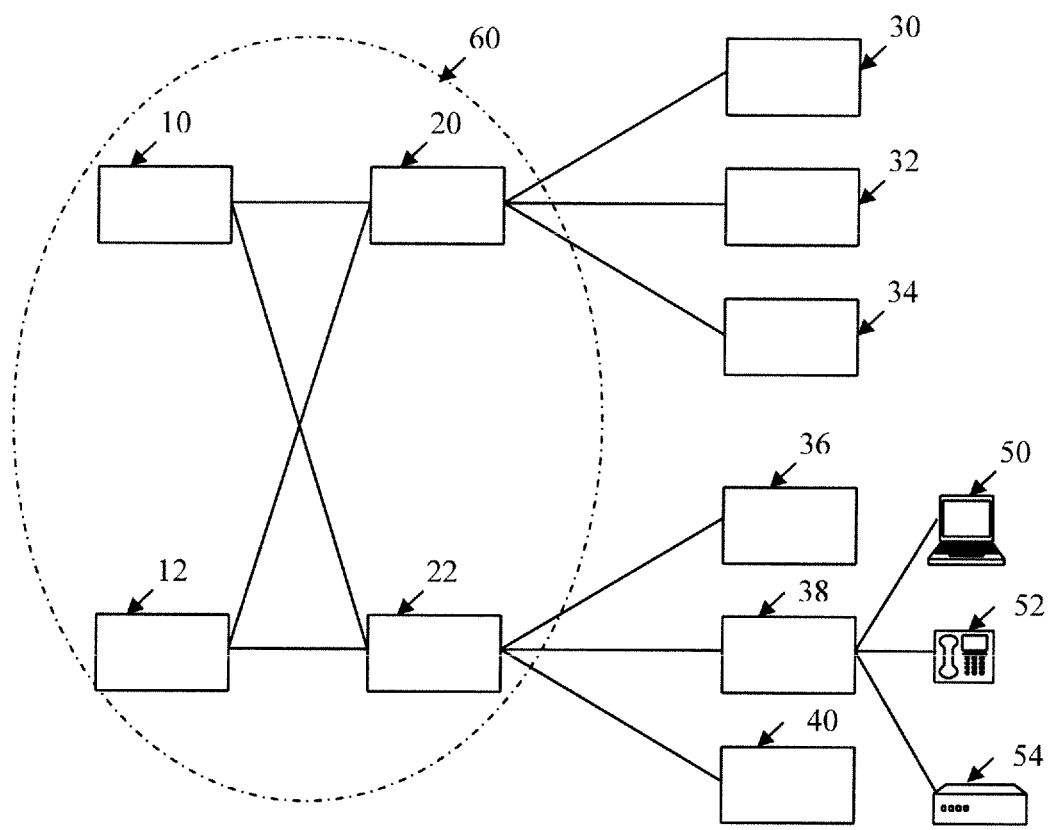
FIG. 1 represents a supervisory system in a communications network.

FIG. 1 shows a supervisory system 60 in a communications network. The system is made up of at least one master supervisor device and at least one first level supervisor device. Two master supervisor devices 10, 12 and two first-level supervisor devices 20, 22 are represented in FIG. 1. Different types of terminal units are connected to these units. These can be customer site input units 38, such as user gateways or a small or medium-size enterprise router. This client site input unit 38 is connected to client units 50, 52, 54 such as a Voice over IP telephone, a computer, home automation units.

These can also be consumer terminal units 30, 32, 34, 36.

Optionally, if it is possible in the communications network to initialize measurements from a terminal unit, a robot unit 40 is connected to the first-level supervisor device.

The site input unit 38 can where appropriate relay information notifications sent by the terminal units 50, 52, 54 that are connected to it or generate information notifications itself from information it has collected by any means.

Below, all of these units able to send information notifications to a first-level supervisor device are referred to as terminal units.

The terminal units 36, 38, 40 all send the collection device 22 information notifications of different types, for example monitoring notifications, configuration notifications, measurement notifications, counting notifications, and authentication notifications.

The information notifications are sent using various formats, for example, such as Syslog for monitoring notifications, SNMP (Simple Network Management Protocol) for configuration notifications, IPFIX (IP Flow Information Export) for counting notifications, etc.

In one particular embodiment, the information notifications are coded in information tickets conforming to the IPFIX protocol defined by the IETF (Internet Engineering Task Force), i.e. each information ticket is encoded according to a predefined pattern. The pattern defines a format model of consecutive information fields. An information ticket therefore takes the form of a pattern identifier and a set of codes corresponding to fields of said tickets.

The remainder of the description refers to this particular embodiment.

Standardized patterns are known in the art enabling a unit of a communications network to report to a collection device counting information tickets linked to IP streams. The network unit effects a count relating to IP streams passing through it and collects pertinent information, which is then sent to a collection device in a manner structured as a function of the pattern. Each ticket contains information fields identifying the stream, based primarily on the header of the IP frame (the source and destination IP address pair, the level 4 protocol and the ports used, the TOS (Type Of Service) field, and the counting information fields (volume measurements in frames and bytes)).

According to an embodiment of the invention, new patterns are defined specifying the information fields present in the information tickets sent, enabling a terminal unit to report supervision information to a supervisor device:
    a GeneralContext pattern for notifying configuration information such as a description of the units connected, their brand, their software version, etc.;
    an AtomicMonitoringAlarm pattern for notifying monitoring information such as an event type, a supervision information category, a refined description of the monitoring information, etc.

The two patterns include an information field corresponding to an identifier of the source of the ticket, for example the IP address of the sender of the ticket.

The monitoring notifications that can be reported to a supervisor unit relate to different types of information, for example alarms, measurements, authentication, billing, identification, invoicing, location, etc. In the particular embodiment described here, these various types of information are transmitted according to the same pattern. It is naturally possible to define as many patterns as there are types of information to be transmitted.

For example, the supervision information category can be:
an anomaly;
an indication;
location information;
information relating to measurements characterizing performance or quality;
configuration information;
statistics, etc.

Again by way of example, the event type can be:
system;
operating system;
a service type: Voice over IP (VoIP) service, television service, video on demand service;
billing;
autotest measurement;
authentication information, for example AAA (Authentication Authorization Accounting) information, etc.

In a variant, a plurality of patterns can be defined for sending an information notification as a string of tickets. The master ticket contains a reference to another ticket. The secondary ticket provides a more detailed view relative to the ticket to which it is chained. The further down the hierarchy of tickets, the more precise the information. It is clear that the master ticket and the chained secondary tickets can be received successively in time.

For example, the GeneralContext pattern defined above includes the information fields necessary to identify the units and a secondary pattern specifies the unit.

The AtomicMonitoringAlarm pattern defined above further includes information (event type, supervision information category), a sequential event number EventID, and a link to a secondary pattern for describing the monitoring information in a more refined way. Thus as many chained levels can be defined as may be necessary for a complete description of the information.

There is provision for sending the various types of information such as alarms, measurements, authentication information, billing information, identification information, and location information.

This variant can therefore receive from a unit an information notification for a particular event consisting of a number of information tickets, comprising a master ticket and at least one chained secondary ticket.

Below, the term "notification" covers all fields linked to a particular event reported by a unit, whether the information fields were received in a single information ticket or, as in the above variant, in a string of information tickets.

Moreover, the expression "notification imprint" refers to the result obtained after extracting a number of predetermined fields from a notification. An imprint can be more or less deep as a function of the number of predetermined fields extracted.

The method of supervising a plurality of units in a communications network is described below with reference to FIG. 2.

Figure 2:
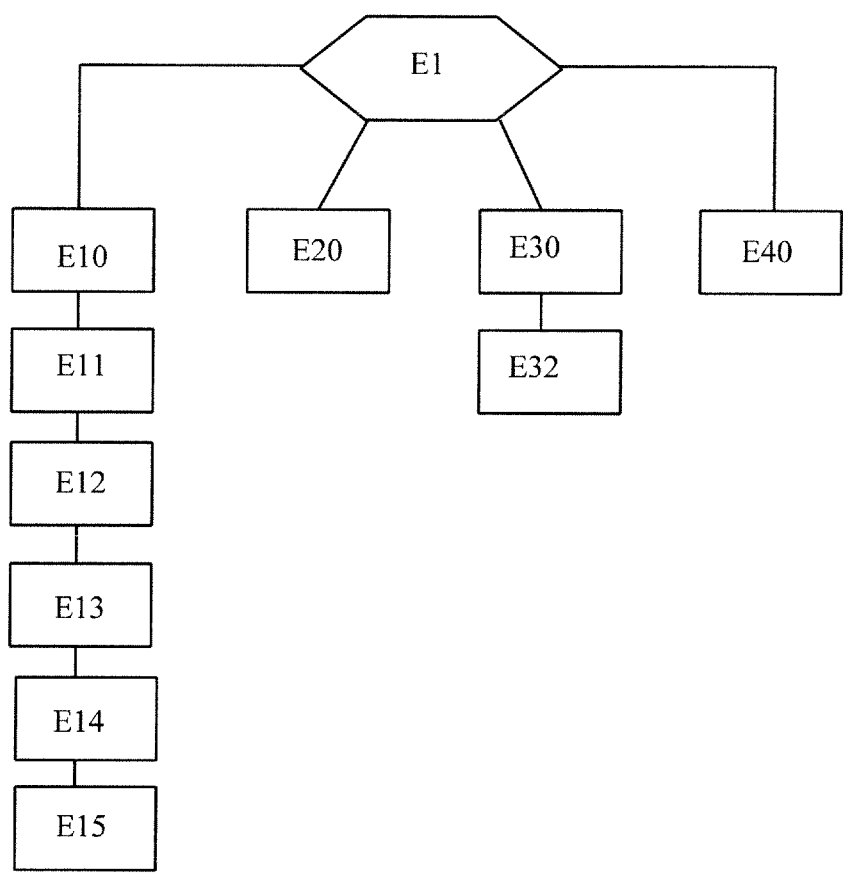
FIG. 2 represents the steps of the method of one particular embodiment of the invention.

In a previous step, not represented in FIG. 2, the first level supervisor device 20, 22 receives configuration parameters from a master supervisor device 10, 12. For example, these configuration parameters define thresholds that are used afterwards to determine fields from which the imprint is generated and a rate of aggregation and thus to trigger protection mechanisms, for example regulation of the sending of notifications to the master supervisor device. In use, the master supervisor device can also modify these thresholds and send new thresholds to the first level supervisor device.

The first level supervisor device 20, 22 optionally determines, for example by observation of the information notifications, thresholds used thereafter to determine the fields from which the imprint is generated and a rate of aggregation. In use, it can also adjust these thresholds.

The master supervisor device can also request the first level supervisor device to send back only a summary linked to a service, to a supervision information type, to an event type, to a geographical area, for a set of units with the same IP address prefix, etc.

The first level supervisor device waits for an event. The event type is tested in a test step E1.

If the event is reception of an information notification from a terminal unit 36, in an imprint generation step E12 the first level supervisor device generates an imprint corresponding to the notification received. Note that the criteria for sending information notifications are specific to the terminal units and are not described in more detail in the present document. The imprint is made up of codes extracted from predetermined information fields of the notification. For example, an information ticket received from the terminal unit at the IP address 139.100.34.1:

| Set ID = 511 (AtomicMonitoringTemplate) | Length |
|---|---|
| 139.100.34.1 (MonitoringFlowID) | |
| 1 (Type: system) | 1 (Category: Anomaly) |
| 502 (chaining to other ticket) | 9003 (EventID) | corresponds to the following sequence of codes (511, 139.100.34.1, 1, 1, 502, 9003).

The imprint generated is (511, 1, 1) for parameter settings such that the imprint is generated from codes extracted from the following information fields: (Set ID, event type, supervision information category). As a function of the number of predetermined fields, the first level supervisor device produces a more or less deep imprint by taking account of various information fields with, in the present variant, information fields contained in chained information tickets. Accordingly, in the event of an overload, it does not take account of the chained secondary tickets in this variant.

Then, in a counting step E13, the first level supervisor device updates the number of occurrences of the imprint determined in the step E12 on the fly, i.e. in real time. This step can use fast search algorithms to search coding trees, a leaf of the tree containing the number of occurrences. Thus in the above example the number of occurrences of the leaf of the tree (511, 1, 1) is incremented by one.

Figure 3:
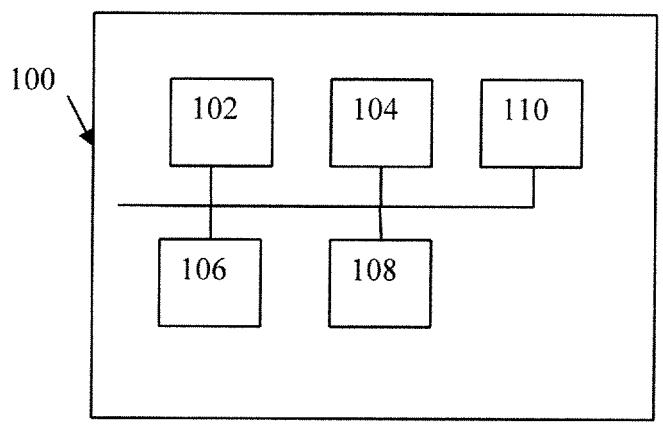
FIG. 3 represents a supervisor device of an embodiment of the invention.

In a storage step E15, the first level supervisor device stores the information notification received in a table 110, as shown in FIG. 3. This table 110 can contain the information notifications as received. Only one table is shown; there can be a plurality of tables, however, as a function of the type of notification. There is then a context table for configuration notifications, a monitoring table for monitoring notifications, a counting table for counting notifications, a measurement table for measurement notifications, etc. In another particular embodiment, the first level supervisor device executes, before the storage step E15, a step E14 of aggregating the notifications in accordance with a rate of aggregation. For example, such tables for counting information tickets are already known in the art, from the document available at the following address: http://tools.ietf.org/wg/ipfix/draft-dressler-ipfix-aggregation-03.txt. As a function of the notification type and the rate of aggregation, the first level supervisor device updates the fields corresponding to the aggregated information in the table 110 corresponding to the type of notification. As a function of the rate of aggregation, the notifications are aggregated to a certain depth for a terminal unit, for a set of terminal units or for a sub-network. For example, the context aggregation table 110 contains the following elements: aggregation identifier, unit description, brand, software version, time first ticket received, time last ticket received.

Still by way of example, the monitoring aggregation table 110 contains the following elements: aggregation identifier, type, category, chained ticket pattern, event number, time first ticket received, time last ticket received, number of master tickets, number of secondary tickets, etc.

The first level supervisor device then waits for a new event.

If the event is an internal event reporting that the rate of arrival of information notifications from a terminal unit has crossed a threshold, the first level supervisor device then determines, in a determination step E20, the fields of the notification from which the imprint is to be generated and the rate of aggregation to be used thereafter as a function of a rate of arrival of the information tickets. The supervisor device changes operating mode, for example from a normal mode to a saturated mode, as a function of the rate of arrival of the information notifications. Note, therefore, that in the event of a sudden increase in the rate of arrival from one or more terminal units, the number of notification fields from which the imprint is generated and the rate of aggregation will decrease. Accordingly, the summary supplied to the master supervisor device is less detailed. The information stored in the aggregation tables is also less precise. For example, in the present variant, as a function of the rate of aggregation, the first level supervisor device does not process chained secondary tickets. The memory and calculation time capacities of the first level supervisor device are therefore preserved. The master supervisor device gets a modified summary and is not buried by an avalanche of notifications. The first level supervisor device can also notify the master supervisor device that a threshold has been crossed.

The first level supervisor device then awaits a new event.

If the event is detection of the expiry of a time-out for sending summaries, the first level supervisor device then, in a notification step E30, sends a master supervisor device 10, 12 an imprint notification containing at least one imprint and the number of occurrences counted for that imprint. A summary consists of a plurality of imprint notifications.

For example, if an anomaly affects all terminal units providing a voice over IP service, for a number of fields from which the imprint is generated equal to three there is obtained an imprint (511, 1, 4) for "anomaly" and "VoIP" and a number of occurrences equal to 500. It is assumed that the imprint (511, 1, 1) is also obtained for a system anomaly and a number of occurrences equal to one. The first level supervisor device therefore sends back to the master supervisor device a summary consisting of the imprint notifications (511, 1, 1, 1) and (511, 1, 4, 500). The summary enables the master supervisor device to take note of widespread occurrence of an anomaly affecting a large number of voice over IP terminal units and also an isolated system anomaly. This detects and groups together the most active information streams in order to send pertinent grouped information in real time to the network supervision applications.

The first level supervisor device then awaits a new event.

If the event is a request for detailed information from the master supervisor device, the first level supervisor device then executes a step of selecting the requested detailed information by reading the tables 110 storing the information notifications and sends the selected information to the master supervisor device in a sending step E40.

The first level supervisor device then waits for a new event.

In the present variant, the method optionally includes a step E10 of regulating information notifications before the imprint generation step E12. The regulation step eliminates tickets from the string as a function of the load on the first level supervisor device. Accordingly, even before the imprint generation step, one or more ticket chaining levels can be eliminated, the imprint being generated from codes extracted from master level fields in the event of a high load, for example.

The method optionally further includes after the information notification receiving step a step E11 of sorting the notifications as function of a type contained in a field. The step E13 of counting at least one imprint is effected on the imprints generated from notifications sorted by type. A summary is then obtained for each type of information as a function of the imprints generated for each type. For example, a first summary can be obtained by processing GeneralContext information tickets and second summary can be obtained by processing AtomicMonitoring information tickets. More detailed summaries can also be generated from the Atomic-Monitoring information tickets.

If the master supervisor devices are dedicated to one type of supervision, the information notification summaries can be sent to master devices as a function of the supervision type, for example: a counting summary is sent to a first master supervisor device 10, the configuration and monitoring summaries are sent to a second master supervisor device 12, and a measurement summary is sent to a third supervisor device that is not represented in FIG. 1.

A first level supervisor device 100 adapted to supervise a plurality of units in a communications network is described below with reference to FIG. 3.

Referring to FIG. 3, this first level supervisor device 100 comprises:

means 102 for receiving from a plurality of units information notifications comprising a plurality of information fields;

means 104 for generating for each notification received at least one imprint consisting of codes extracted from predetermined fields of said notification;

means 106 for counting the number of occurrences of an imprint;

means 108 for notifying a master supervisor device of at least one imprint and the number of occurrences counted for that imprint.

The supervisor device 100 optionally also includes at least one notification table 110 adapted to store detailed or aggregate information.

The modules 102, 104, 106, 108 that execute the above method are preferably software modules comprising software instructions for execution of the steps of the above method by the first level supervisor device 100.

The software modules can be stored in or transmitted by a data medium, which can be a hardware storage medium, for example a CD ROM, a magnetic diskette or a hard disk, or a transmission medium such as an electrical, optical or radio signal, or a telecommunications network.

An embodiment of the invention also relates to a supervision system 60 adapted to supervise a plurality of units in a communications network and comprising at least one supervisor device 100 as described above and at least one master supervisor device 10, 12 comprising means for receiving a notification comprising at least one imprint and a number of occurrences counted for that imprint.

One particular embodiment of the method is described that feeds back information notifications using the IPFIX protocol. It is readily applicable to supervising terminal units sending back information with any type of coding, and heterogeneous codes, such as Syslog, SNMP, can be used for the various types of supervision notification.

The above description has been given in the context of an IP packet communications network. One or more embodiments of the invention applies equally to any type of communications network.

Although the present disclosure has been described with reference to one or more examples, workers skilled in the art will recognize that changes may be made in form and detail without departing from the scope of the disclosure and/or the appended claims.

The invention claimed is:

1. A method of supervising a plurality of units in a communications network, comprising:
   a step of a first supervisor device receiving, from a plurality of units, information notifications each comprising codes in a plurality of information fields;
   a step of determining fields of the notifications to be extracted, as a function of a rate of arrival of the notifications at the first supervisor device;
   a step of extracting a portion of the codes from the determined fields of each received information notification;
   a step of generating, for each received information notification, at least one imprint comprising said codes extracted from the determined fields of the received information notification;
   a step of counting the number of occurrences of identical imprints; and
   a step of notifying at least one master supervisor device of each counted imprint and the number of occurrences counted for that imprint.

2. A method according to claim 1, wherein a notification comprising chained information tickets is received at least from a unit and an imprint is generated from fields of all said tickets.

3. A method according to claim 2, further comprising, before executing the imprint generation step, a step of regulating the notifications by eliminating tickets from the chain as a function of load on the first supervisor device.

4. A method according to claim 1, further comprising a step of the first supervisor storing received information notifications and a step of sending stored information following a request from the master supervisor device, said request being effected after a notification.

5. A method according to claim 4, comprising, during the received notification storage step, aggregation of said notifications by the first supervisor device in accordance with a rate of aggregation that also depends on the rate of arrival of notifications at the first supervisor device.

6. A method according to claim 1, further comprising, after the notification reception step, a step of sorting the notifications as a function of a type contained in a field and wherein the step of counting at least one imprint is effected on the imprints generated from notifications sorted by type in order to generate a view for each type.

7. A method of claim 1, wherein the determined fields comprise some, but not all, of the plurality of information fields.

8. A method of claim 1, wherein the at least one imprint for each received information notification is generated using less than all of the codes in the plurality of information fields of said received information notification.

9. A supervisor device adapted to supervise a plurality of units in a communications network, the device comprising:
   a hardware storage medium; and
   software modules stored on the hardware storage medium and executable by the supervisor device, the software modules comprising:
   a software module configured to receive, from a plurality of units, information notifications each comprising codes in a plurality of information fields;
   a software module configured to determine fields of the notifications to be extracted, as a function of a rate of arrival of the notifications at the first supervisor device;
   a software module configured to extract a portion of the codes from the determined fields of each received information notification;
   a software module configured to generate, for each received information notification, at least one imprint comprising said codes extracted from the determined fields of the received information notification;
   a software module configured to count the number of occurrences of identical imprints; and
   a software module configured to notify at least one master supervisor device of each counted imprint and the number of occurrences counted for that imprint.

10. A supervision system adapted to supervise a plurality of units in a communications network, the system comprising:
    at least one supervisor device according to claim 9;
    at least one master supervisor device comprising a software module configured to receive a notification comprising at least one imprint and a number of occurrences counted for that imprint.

11. The supervisor device of claim 9, wherein a notification comprising chained information tickets is received at least from a unit and an imprint is generated from fields of all said tickets.

12. The supervisor device of claim 9, the software modules comprising:
    a software module configured to, before the at least one imprint is generated, regulate the notifications by eliminating tickets from the chain as a function of load on the first supervisor device.

13. The supervisor device of claim 9, the software modules comprising:
    a software module configured to, after the information notifications are received, sort the notifications as a function of a type contained in a field, wherein counting the at least one imprint is effected on the imprints generated from notifications sorted by type in order to generate a view for each type.

14. A program for use by a first supervisor device, the program comprising program instructions stored on a storage medium that is readable by the supervisor device, wherein the instructions are adapted to command execution of a method of supervising a plurality of units in a communications network, when said program is executed by the supervisor device, wherein the instructions comprise:
    a step of the first supervisor device receiving, from a plurality of units, information notifications each comprising codes in a plurality of information fields;
    a step of determining fields of the notifications to be extracted, as a function of a rate of arrival of the notifications at the first supervisor device;
    a step of extracting a portion of the codes from the determined fields of each received information notification;

a step of generating for each received information notification at least one imprint comprising said codes extracted from the determined fields of the received information notification;

a step of counting the number of occurrences of identical imprints;

a step of notifying at least one master supervisor device of each counted imprint and the number of occurrences counted for that imprint.

15. The program of claim 14, wherein the instructions comprise a step of determining said determined fields of the notification to be extracted from which an imprint is generated as a function of a rate of arrival of the notifications at the first supervisor device.

16. The program of claim 14, wherein a notification comprising chained information tickets is received at least from a unit and an imprint is generated from fields of all said tickets.

17. The program of claim 14, wherein the instructions comprise, before generating the at least one imprint, a step of regulating the notifications by eliminating tickets from the chain as a function of load on the first supervisor device.

18. The program of claim 14, wherein the instructions comprise a step of the first supervisor storing received information notifications and a step of sending stored information following a request from the master supervisor device, said request being effected after a notification.

19. The program of claim 14, wherein the instructions comprise, after receiving the information notifications, a step of sorting the notifications as a function of a type contained in a field and wherein the step of counting at least one imprint is effected on the imprints generated from notifications sorted by type in order to generate a view for each type.

* * * * *